United States Patent [19]

Hoyle et al.

[11] 4,022,384

[45] May 10, 1977

[54] IRRIGATION TUBING

[75] Inventors: Wallis I. Hoyle; John D. Schmunk, both of Findlay, Ohio

[73] Assignee: Hancor, Inc., Findlay, Ohio

[22] Filed: Dec. 8, 1975

[21] Appl. No.: 638,964

[52] U.S. Cl. .................................. 239/542; 138/42; 61/12

[51] Int. Cl.² ........................................ B05B 15/00

[58] Field of Search ............ 138/42, 37, 111, 114, 138/115, 116, 148, 154, 177, 42; 239/542, 76, 195, 450, 547, 554, 556, DIG. 12, 542; 61/12, 13

[56] References Cited

UNITED STATES PATENTS

| 3,672,571 | 6/1972 | Goodricke | 138/115 X |
|---|---|---|---|
| 3,777,987 | 12/1973 | Allport | 239/542 |
| 3,870,236 | 3/1975 | Sahagun-Barragan | 239/542 |
| 3,873,030 | 3/1975 | Barragan | 239/542 |
| 3,887,138 | 6/1975 | Gilead | 239/542 |
| 3,896,999 | 7/1975 | Barragan | 239/542 X |
| R28,095 | 7/1974 | Chapin | 138/114 X |

*Primary Examiner*—Harry N. Haroian
*Attorney, Agent, or Firm*—Fay & Sharpe

[57] ABSTRACT

Irrigation drip tubing including an outer tubular member having an inside wall and an outside wall and an inner tubular member having a repetitious pattern of inlet apertures, crests and roots. The crests engage the inside wall of an outer tubular member in a liquid-tight manner. The roots form conduits which connect to form oppositely directed passageways through which the fluid flows resulting in a pressure drop that drastically reduces the fluid volume flow. The inlet apertures in the inner tubular member provide for fluid communication between the inside of the inner tubular member and the passageway. Removable bosses may optionally cover outlet apertures. If used, the bosses project outwardly from the outside wall of the outer tubular member and are located periodically along the length of the tubing.

17 Claims, 9 Drawing Figures

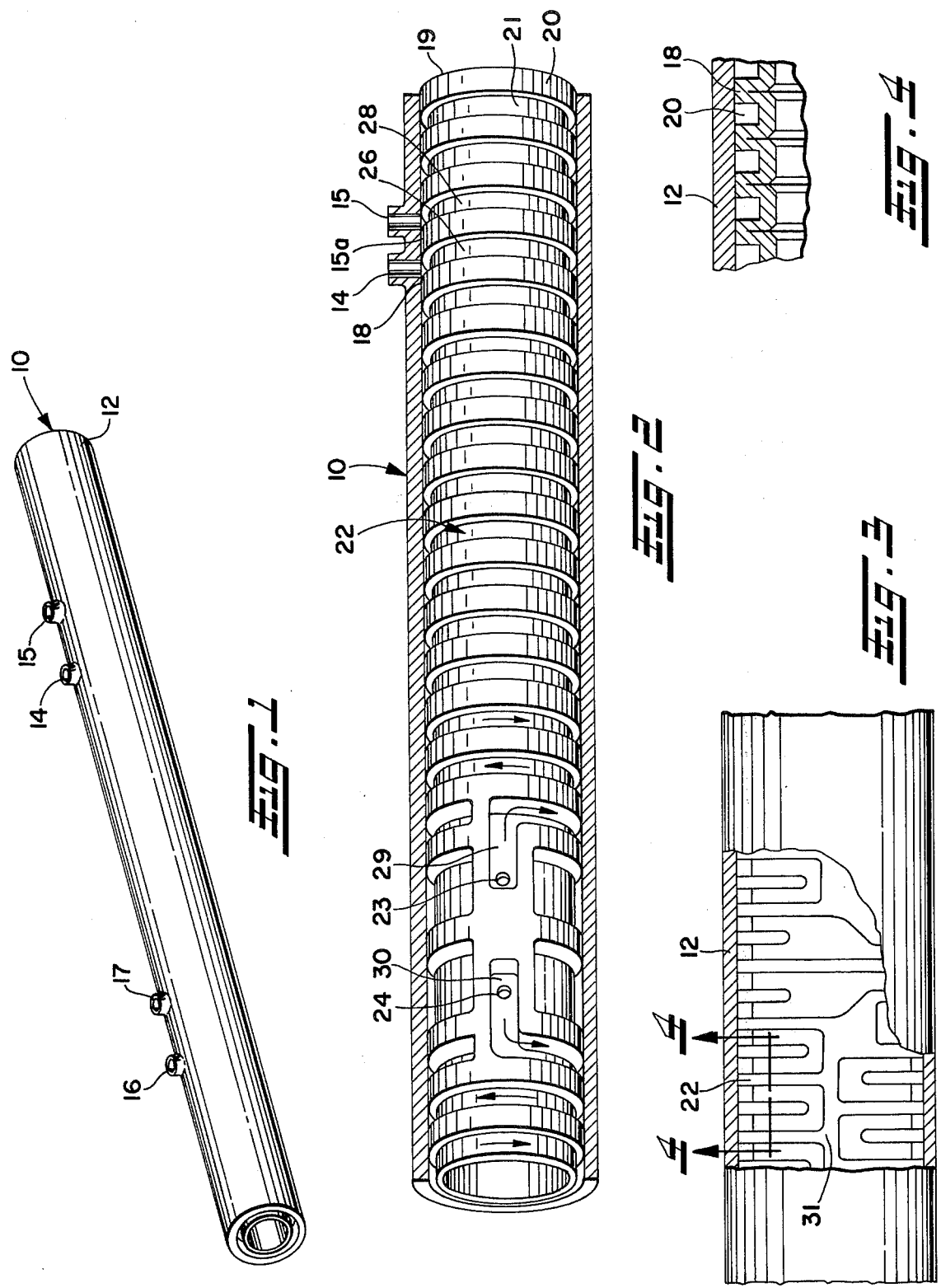

IRRIGATION TUBING

BACKGROUND OF THE INVENTION

This invention relates to irrigation drip or trickle tubing. In recent years, irrigation drip tubing has become popular to increase agricultural yields. Accurate watering of the root areas of plants causes an improved growth rate and the lack of watering between plants reduces weeds. Concentrated irrigation also gives maximum utilization of available water, and the tubing itself can be used to meter liquid fertilizers, pesticides and soil conditioners.

The basic concept of irrigation tubing is sound but the design of the tubing should meet certain practical criteria. Because plants may be spaced unevenly, it is often highly desirable to have a variable means for determining the location of the outlet apertures and the flow therethrough. That is, the outlets of the irrigation tubing should be available on a basis of need rather than on any predetermined manufactured spacing. Maturing young orchards are a specific example of a crop that may require additional outlets in irrigation tubing over a period of time.

It is also highly desirable to provide a pressure reduction means within the tubing in order to permit the water to drip out at a predetermined rate regardless of the outlet aperture size. Insects have been known to enlarge outlet apertures in irrigation tubing by chewing the edges thereof. Alternately, impurities in the water may also reduce the outlet sizes. If the drip rate is dependent on outlet size, undesirably high flow rates result. Drip irrigation tubing should also be economical to manufacture, soundly designed and easy to put into operation. For example, large appendages extending from the tubing should be avoided as should any design requiring hand assembly.

Previous irrigation tubing has attempted to satisfy the requirements involved but have been deficient in some respect. For example, some outlet openings on prior art tubing are placed in a tubular member at the time the tubing is put into operation in the field. This field operation is time consuming and carelessness could cause water to enter the field at a higher or lower rate than desired and in the wrong location. The size of the outlet opening is not adequately uncontrollable and the resulting flow rates may differ considerably.

In systems where the irrigation drip holes in the outer tubular member are made at the time of manufacture, irrigation occurs uniformly along the entire length of the tubing. Thus, where plants are not evenly distributed, water is used unnecessarily. Many irrigation systems also use the size of the outlet aperture to control flow rate and encounter the above-noted insect problem.

This invention has the advantage of variable flow rates at a given location. The use of a plurality of removable bosses over outlet apertures allows irrigation only where desired and at different rates. The design and size of the tortuous path of this invention and not the sizes of the inlet or outlet aperture are used to govern the flow rate. Insect damage to or accidental enlargement of the outlet apertures does not vary the flow. A particular feature of this invention is the use of closely spaced paired outlet apertures fed by separate oppositely directed passageways. The outlet flow rate may thus be adjusted by a factor of two and, alternately, one aperture may be reserved in case the other one clogs. A separate inlet aperture is used to feed each passageway and thus isolates any obstruction. This tubing is also economical to manufacture and put into operation. No special hand fitting is required.

SUMMARY OF THE INVENTION

An irrigation tubing comprising an outer tubular member having an inside wall, an outside wall and outlet apertures therethrough. An inner tubular member fits inside the outer tubular member and has a repeating pattern of crests and roots. The crests engage the inside wall of the outer tubular member, and the roots form connected conduits defining a tortuous passageway which reduces the pressure of liquid traveling therein. Apertures in the inner tubular member provide for fluid communication between the inside of the inner tubular member and the passageway.

BRIEF DESCRIPTION OF THE DRAWINGS

FIG. 1 is a perspective view of the irrigation tubing of this invention;

FIG. 2 is a side view of the tubing with the outer tubular member partially removed;

FIG. 3 is a plan view of a section of one side of the irrigation tubing with the outer tubular member partially removed;

FIG. 4 is a section 4—4 taken through FIG. 3; and

DETAILED DESCRIPTION OF THE DRAWINGS

Figure 5:
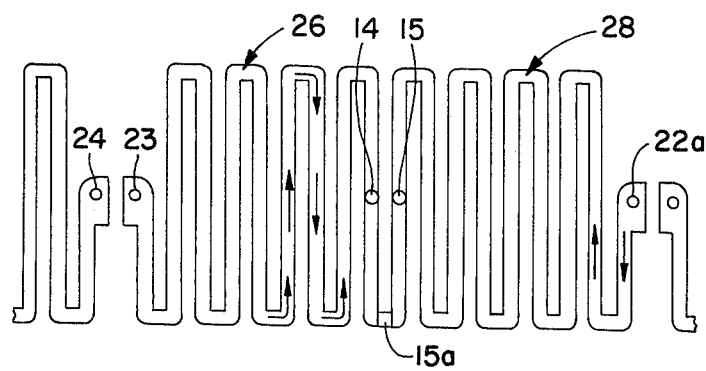
FIGS. 5 through 9 illustrate tortuous paths utilized on the inner tubular member.

As illustrated in FIGS. 1 through 4, a repetitive pattern of irrigation drip tubing 10 includes an outer tubular member 12 having a substantially circular cross-section and outlet bosses 14 and 15 at repetitive periodic intervals. Different shapes of the outer tubular member will be obvious to one skilled in the art. It is only necessary to have some combination of corrugated and/or smooth layers that can result in a continuous passageway for the fluid. The pair of outlet bosses 14 and 15 are spaced about 18 inches from the previous bosses 16 and 17. The bosses may be any type of removable element which covers an outlet aperture 18. Normally, the bosses 14 and 15 will be centrally located between inlets as discussed hereinafter. However, it is fully anticipated that a series of bosses or apertures may be located along the length of the tubing to provide maximum flexibility in the choice of outlets and the flow emanating therefrom. Those outlets closer to the inlet apertures will have a higher pressure and greater flow. The individual bosses 14 an 15 are spaced by one completely circumferential crest 15a which acts as a seal between them. The bosses are formed during the process of manufacture and may have various sized diameters, but 0.080 inches has been found to work satisfactorily. As noted earlier, the size of the inlet and outlet apertures is not critical to the determination of the flow rate which may vary from 0.25 to 8 gallons per hour. One gallon per hour is common using a passageway length of travel about 200 inches or a tubing length of 9 inches.

The outer tubular member 12 will vary according to the size of irrigation drip tubing desired. The range of sizes will be about ¼ inch to 1-½ inches having a wall thickness of about 0.005 to 0.06 inches and averages about 0.020 inches. The material used in the outer tubular member as well as the inner tubular member may be polyethylene, polypropylene, polybutene, polyvinylchloride, thermoplastics, elastomers, copolymers and other material and synthetic resins, polyester resins and laminates. The material must be such that it will resist ultraviolet degradation, heat, chemicals and moisture found in its environment.

An inner tubular member 19 includes crests 20 and roots 21 which form a series of connected conduits 22 forming passageways 26 and 28 (FIG. 5) extending the length of the tubing. The shape of the conduits can take many forms but a square configuration has proven useful. The sizes of the conduits 22 may vary from about 0.015 to 0.125 inches square but .055 inches square have been found to work satisfactorily. Inlet apertures 23 and 24, about 0.080 inches in diamter, provide openings for water on the inside of the inner tubular member to enter the passageways 26 and 28. The size of the inlet apertures may vary. Lands 29 and 30 optionally surround the apertures 23 and 24 and act as the channeling means for directing the water as shown by the arrows in FIG. 2 into the conduits which combine to form passageways. A pair of inlets are located about every 18 inches along the tubing. This distance is variable with the size of the conduits, the length of the tubing and the pressure drop desired. A longitudinal crest 31 (FIG. 3) along the length of the inner tubular member engages the inside wall of the outer tubular member 12. The crest 31 prevents any water from moving between conduits 22 except through the passageway formed by the crests and roots. There are different possible passageway designs. As illustrated in FIG. 5, the passageways 26 and 28 in the preferred embodiment include circumferentially extending parallel conduits connected to alternating ends thereof to form a reversing passageway from the apertures 23 and 24. The passageways 26 and 28 are separated by a crest 15a (FIG. 5).

Figure 6:
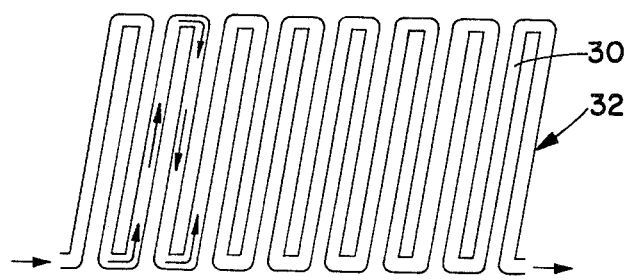

FIG. 6 shows an alternate embodiment of FIG. 5 wherein circumferentially and longitudinally extending parallel conduits 30 are connected at alternating ends thereof to provide a reversing passageway 32. The alternate embodiment of FIG. 6 provides a passageway 32 that is longer than that of FIG. 5 for the same linear length of tubing and will cause a greater reduction in flow rates.

Figure 7:
Figure 8:
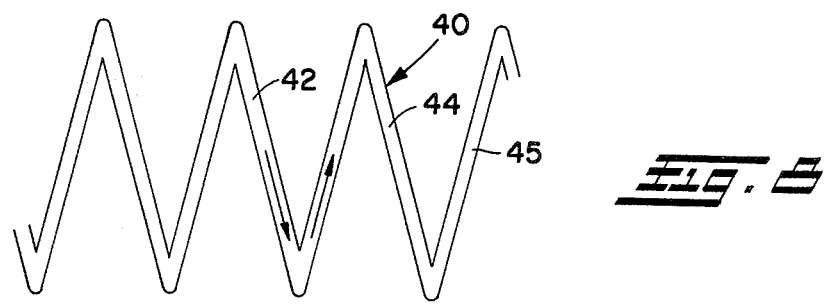

FIG. 7 shows longitudinally extending parallel conduits 34 connected at alternating ends 36 to form a reversing passageway 38 along the length of the tubing. The specie shown in FIG. 8 includes circumferentially and longitudinally extending conduits forming a sawtooth passageway 40 having other conduits 42 and 44 parallel and having the end of each adjacent conduit 44 and 45 connected.

Figure 9:
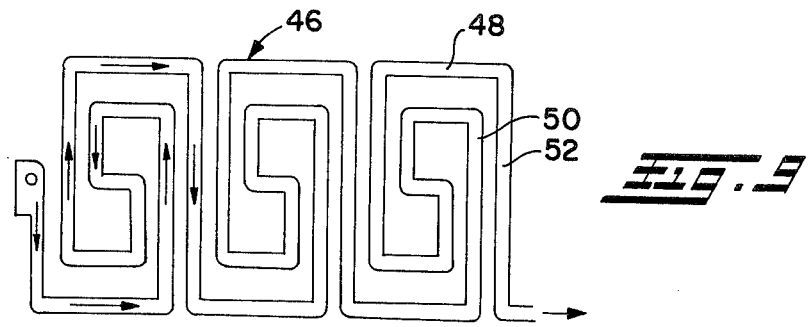

FIG. 9 illustrates an alternate embodiment wherein the tortuous passageway 46 is formed of conduits 48 in a type of swirl effect and includes a series of conduits 50 and 52 which are parallel to each other and reverse several times.

Whatever passageway design is used, there are definite advantages to the use of a pair of spaced inlet apertures feeding oppositely directed passageways to closely spaced outlet bosses. Each closely spaced pair of outlets are fed by inlet apertures usually, but not necessarily separated by about 18 inches which direct water from different directions. Thus, it is highly unlikely that both outlets could become clogged simultaneously. Moreover, if both outlet apertures are open, which normally is the case, the outlet flow rate can be adjusted by a factor of two or more from the rate of a single outlet aperture.

It is also anticipated that inlets and outlets may be alternated instead of paired. Other tortuous paths as well as other alterations in this invention will be obvious to one skilled in the art and those embodiments ae included within the scope of this invention.

The invention claimed is:

1. Irrigation tubing comprising:
   an elongated outer tubular member constructed from a relatively rigid plastic material to have a generally smooth inner peripheral wall and an outer peripheral wall, said outer member including spaced apart fluid outlet apertures communicating between said inner and outer peripheral walls; and,
   an elongated inner tubular member constructed from a relatively rigid plastic material and coaxially disposed within said outer member, said inner member having an inner peripheral surface defining a fluid flow channel and an outer peripheral surface, a repetitive pattern of tortuous conduits having at least some sharp reversing bends therein included in the outer peripheral surface of said inner tubular member, said conduits each having first and second ends and defining crest areas at said outer peripheral surface and root areas spaced inwardly from said outer toward said inner peripheral surface, said inner member further including at least one fluid inlet aperture communicating between said fluid flow channel and each one of said conduits adjacent one end thereof, said inner member being dimensioned such that the crest areas at said outer peripheral surface closely engage the inner peripheral wall of said outer tubular member such that said conduits form repetitive tortuous passageways with at least one of said fluid outlet apertures in said outer tubular member communicating with each of said conduits at the position spaced from said one end toward the other end, whereby fluid passing through the flow channel defined by said inner tubular member passes therefrom and into said passageways through said inlet apertures and exits therefrom outwardly of said irrigation tubing through said outlet apertures at a flow rate partially determined by the length of said passageways.

2. The irrigation tubing of claim 1 wherein at least the outlet apertures are arranged in closely spaced pairs along the length of the outer tubular member and having at least one inlet aperture in operable communication with each of said pairs.

3. The irrigation tubing of claim 2 wherein the inlet apertures are arranged in closely spaced pairs along the length of the inner tubular member with the passageways of the inlet apertures of each pair separated from fluid communication with each other and in operable fluid communication with an outlet aperture in different ones of said outlet aperture pairs by oppositely directed passageways.

4. The irrigation tubing of claim 3 wherein the outlet apertures are included in covered bosses extending radially outward from the outer tubular member.

5. The irrigation tubing of claim 4 wherein the bosses have a generally circular cross-section.

6. The irrigation tubing of claim 1 wherein the crests and roots are integral with said inner tubular member and connected at alternating ends thereof to form a continuous reversing passageway between an inlet aperture in said inner tubular member and an outlet aperture in said outer tubular member.

7. The irrigation tubing of claim 1 wherein the tubing is constructed of a material selected from the group consisting of polyethylene, polypropylene, polybutene and polyvinylchloride.

8. The irrigation tubing of claim 1 wherein the conduits are parallel and extend circumferentially about said inner tubular member, said outlet apertures comprising sealed frusto-conical surfaces extending radially outward from the outer tubular member.

9. The irrigation tubing of claim 1 wherein the conduits are parallel and extend circumferentially about and longitudinally along said inner tubular member.

10. The irrigation tubing of claim 1 wherein the conduits are parallel and extend longitudinally along said inner tubular member.

11. The irrigation tubing of claim 1 wherein the conduits are disposed along said inner tubular member such that alternating ones of said conduits are parallel and extend both longitudinally and circumferentially of said inner member.

12. Irrigation drip tubing comprising:
an elongated inner tubular member constructed from a relatively rigid plastic material and having an inner peripheral surface defining a fluid flow channel and an outer peripheral surface with a plurality of closely spaced pairs of fluid inlet apertures spaced along said inner member at spaced intervals therealong and communicating between said liquid flow channel and said outer peripheral surface, said inner member further including a repetitious pattern of separate tortuous conduits integrally formed therein defining crest areas at said outer peripheral surface and root areas spaced inwardly from said outer toward said inner peripheral surface, one end of each conduit communicating with at least one of said inlet apertures with the other end thereof spaced toward the next adjacent pair of said inlet apertures such that the conduits associated with each of said inlet aperture pairs extend in generally opposite directions from each other along said inner tubular member; and,
an elongated outer tubular member constructed from a relatively rigid plastic material dimensioned to be closely coaxially received over said inner tubular member, said outer tubular member having a smooth inner peripheral wall and an outer peripheral wall with said inner wall in close engagement with the crest areas of said inner tubular member so that said conduits form repetitive tortuous passageways, said outer member including outlet apertures spaced therealong communicating between said inner and outer peripheral walls with at least one of said outlet apertures disposed in registry with each of said passageways at a position therealong spaced from said one end thereof, whereby fluid passing through said flow channel passes therefrom and into said passageways through said inlet apertures and exits therefrom outwardly of said irrigation tubing through said outlet apertures at a flow rate partially determined by the length of said passageways.

13. The irrigation tubing of claim 12 wherein said outlet apertures are arranged in closely spaced pairs along the length of said outer tubular member, each outlet aperture in each pair communicating with a passageway directing fluid flow in a direction along said tubing generally opposite from the fluid flow to the associated outlet aperture.

14. The irrigation tubing of claim 13, wherein said inner tubular member includes a crest disposed between the outlet apertures in each pair to prevent fluid communication between the separate passageways associated therewith.

15. The irrigation tubing of claim 12 wherein the outlet apertures are included in covered bosses extending radially outward from the outer tubular member.

16. The irrigation tubing of claim 15 wherein the bosses have a generally circular cross-section.

17. The irrigation tubing of claim 12 wherein the tubing is constructed of a material selected from the group consisting of polyethylene, polypropylene, polybutene and polyvinylchloride.

* * * * *